Jan. 1, 1963 O. MITCHELL ETAL 3,070,942
COTTON PICKER AND CLEANER
Filed May 5, 1958 3 Sheets-Sheet 1
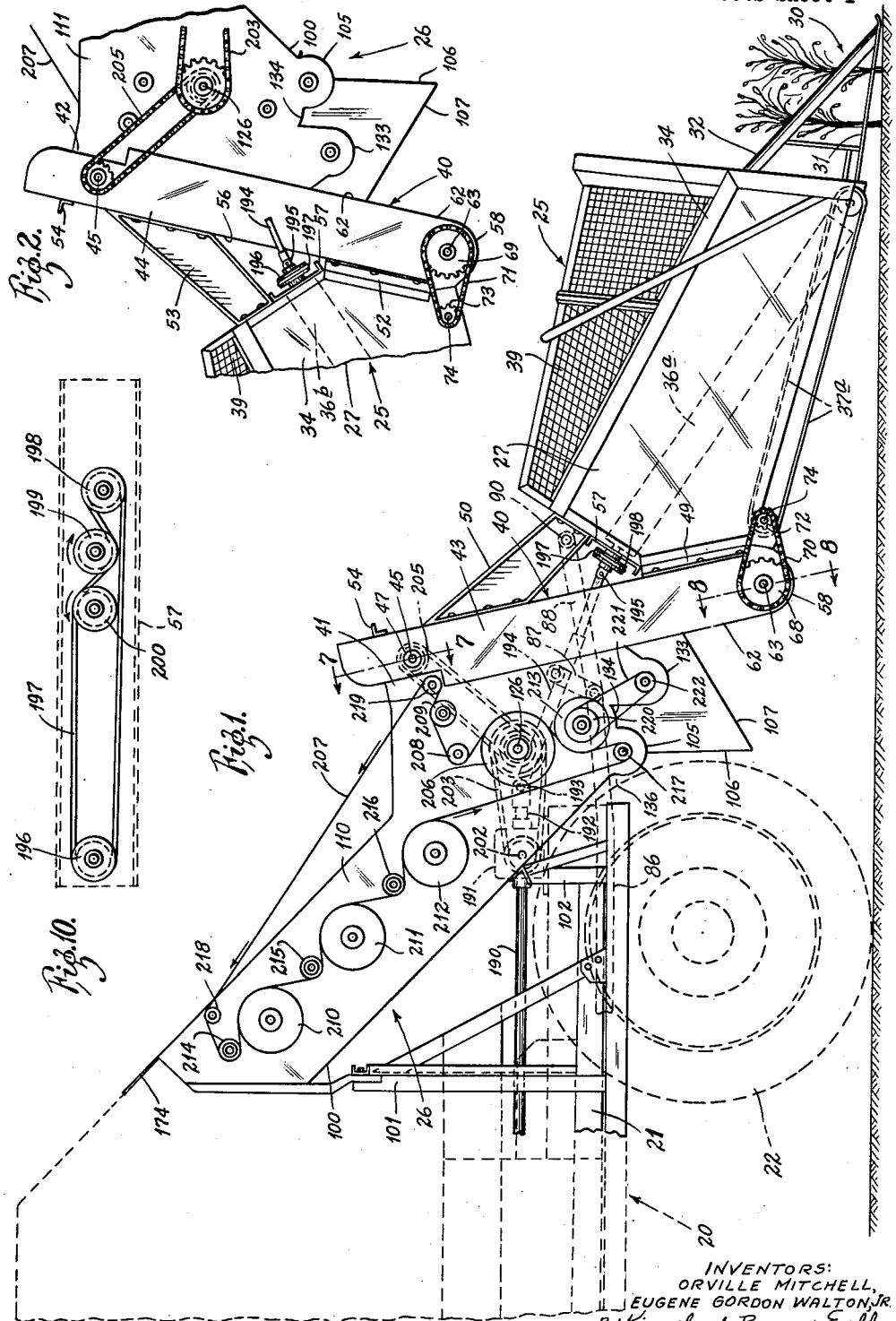
INVENTORS:
ORVILLE MITCHELL,
EUGENE GORDON WALTON, JR.
By Kingsland, Rogers & Ezell
ATTORNEYS

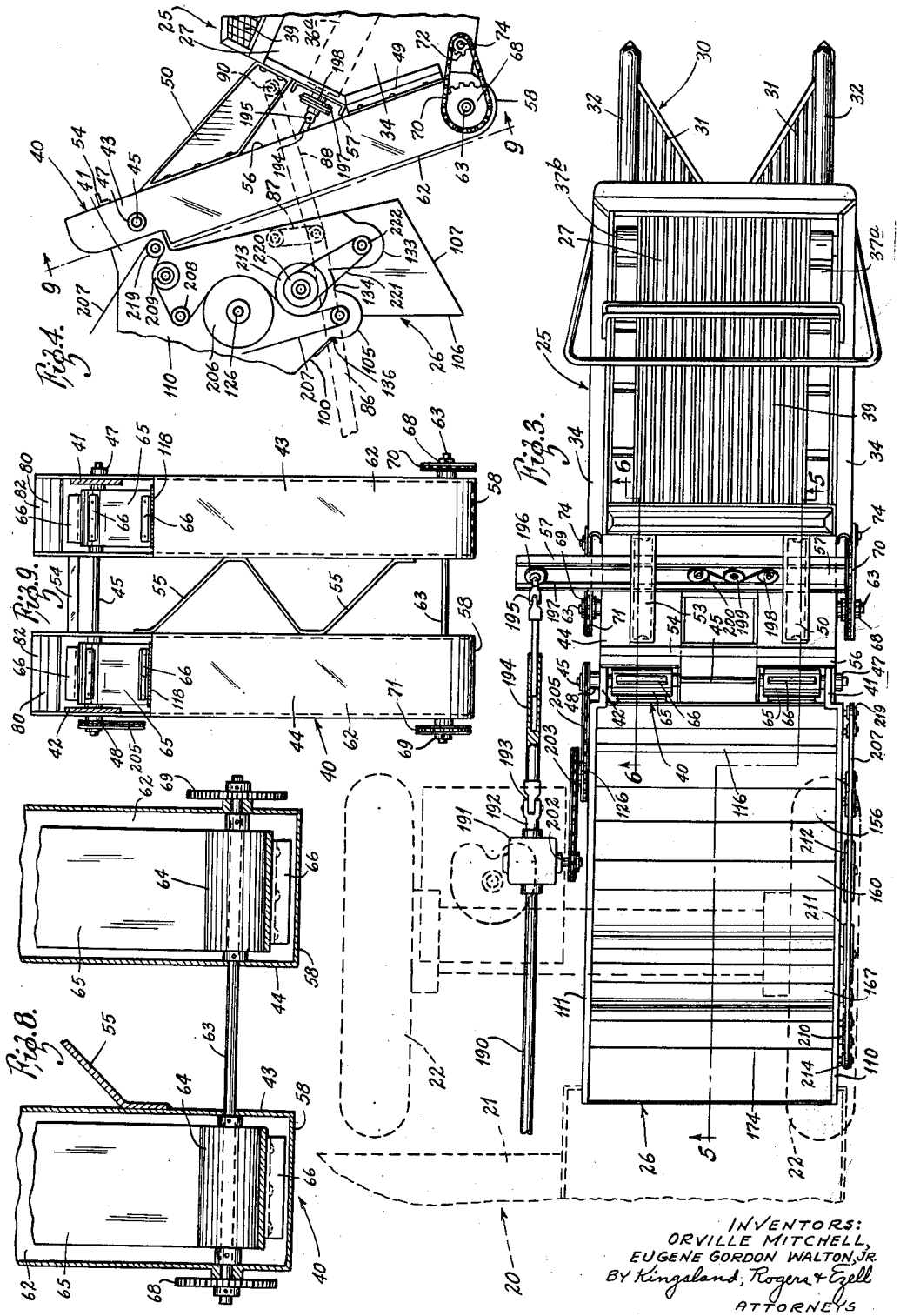

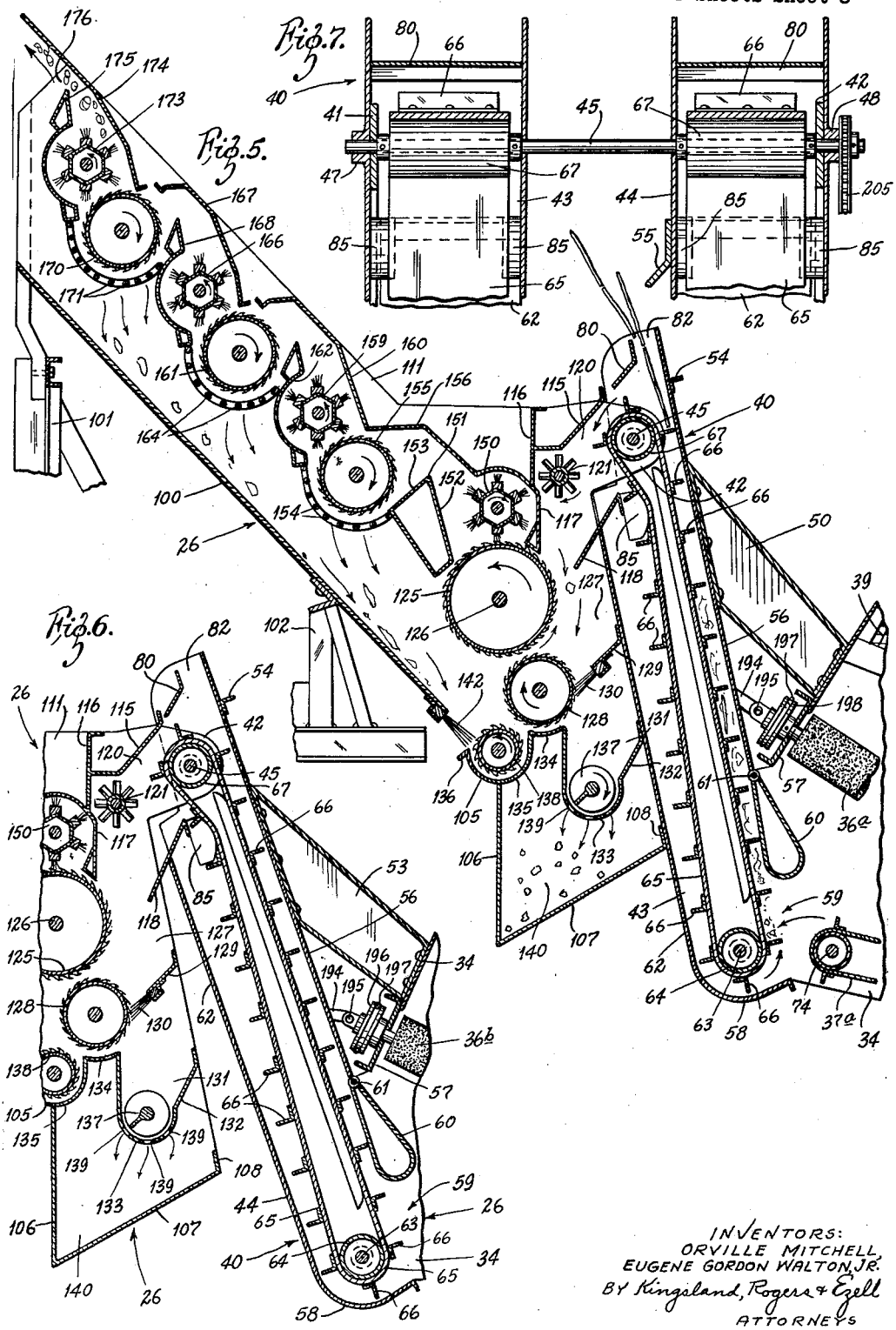

United States Patent Office 3,070,942
Patented Jan. 1, 1963

3,070,942
COTTON PICKER AND CLEANER
Orville Mitchell and Eugene Gordon Walton, Jr., Dallas, Tex., assignors to John E. Mitchell Company, Dallas, Tex., a corporation of Missouri
Filed May 5, 1958, Ser. No. 732,960
11 Claims. (Cl. 56—35)

The present invention relates to a cotton picker and cleaner combination.

The invention incorporates a cotton picking machine with a particular arrangement that permits it to be combined with a form of cotton cleaning machine so that the cotton can be cleaned at the same time it is picked from the plants. The combination is adapted for mounting on a conventional tractor, from which it receives power for effecting the several operations of cotton picking and cleaning. Thus, the cotton may be delivered by this machine directly from the field to the gin, without the necessity for intermediate handling and cleaning.

The invention takes advantage of the necessity for gathering the cotton at its normal low growing level, along with the desirability of elevating the cleaned cotton for discharge into baskets or like contains, to provide a generally upward path for the harvested cotton, as contrasted to a generally downward gravity discharge for the debris which is removed as the cotton is elevated. The green bolls or pods, from which the cotton has not yet burst forth, are largely removed at the beginning of the cleaning ascent and are retained in an appropriate hopper.

In order to assure separation and removal of the sticks and like trash which is gathered by the picker along with the cotton, the novel apparatus uses a cleaning method which initially extracts more than an economically permissible amount of cotton with the trash. This extracted cotton descends, along with the trash, to a low elevation within the machine and is there reclaimed for a second passage through the cleaning section.

Thus, it is a primary object of the invention to provide a novel cotton picker and cleaner combination adapted for tractor mounting which may be employed in the field to harvest cotton, to eliminate accompanying debris, and to deliver clean cotton into a container for transport to a cotton gin, all in a continuous automatic operation.

It is another object of the invention to provide a novel "cotton combine" which functions to pick cotton at its growing level and to elevate the cotton for delivery into containers while at the same time removing unwanted foreign matter therefrom.

It is another object of the invention to provide a novel cotton cleaning apparatus which receives trash laden cotton, including tight cotton bolls, at a low level, which first separates and collects the tight bolls, which thereafter removes the trash, along with a minor portion of the cotton, while progressively raising the major portion of the cotton to a higher level for discharge, which receives the eliminated trash and the accompanying minor portion of the cotton back at a low level, and which reclaims the minor portion of the cotton while discharging the trash.

The foregoing, along with additional objects and advantages, will be apparent from the following description of a preferred embodiment of the invention as depicted in the accompanying drawings.

In the drawings:

FIGURE 1 is a side elevation of the machine, certain parts being shown schematically;

FIGURE 2 is a fragmentary view adjacent the elevator taken from the side opposite that shown in FIGURE 1;

FIGURE 3 is a top view of the device, parts being in section;

FIGURE 4 is a side elevation of the parts adjacent the elevator in position wherein the picking components are raised from the ground;

FIGURE 5 is an enlarged partial longitudinal section taken approximately on the line 5—5 of FIGURE 3;

FIGURE 6 is a similar sectional view taken approximately on the line 6—6 of FIGURE 3, with the parts in the position they occupy when the picking components are raised;

FIGURE 7 is an enlarged transverse section through the top of the elevator taken approximately on the line 7—7 of FIGURE 1;

FIGURE 8 is an enlarged more or less vertical section of the lower part of the elevator taken on the line 8—8 of FIGURE 1;

FIGURE 9 is a rear elevation of the elevator, parts being in section; and

FIGURE 10 is an enlarged diagrammatic view of the drive of the brushes.

Referring to FIGURES 1 and 3, in particular, the machine is shown as mounted upon a suitable tractor 20 that is fragmentarily illustrated in dotted lines, it having a frame 21 and wheels 22.

Mounted on the front of the frame 21 and projecting forwardly from the tractor is the present machine, which includes a cotton picking section 25 and a cleaning section 26 connected for interoperation as will hereafter appear.

The cotton picking component 25 is not here illustrated in detail since one embodiment that may be used is illustrated in the co-pending application Serial No. 653,635, filed April 18, 1957, and now Patent 2,903,835 by Benjamin Oscar Kappelmann. It is illustrated as including a cotton picking and receiving housing 27 of appropriate structural elements, that is generally channel-shaped. Within the channel-shaped housing 27 are slopingly mounted brushes and conveyors, as will appear, the brushes being provided with helically arranged tufts designed to strip the cotton from the plants, and the conveyors being designed to receive the stripped cotton and convey it to an elevator. At the back of the cotton receptacle 27, there is a generally vertical elevator, mounted in a housing. The entire support of the cotton picking component from the tractor takes place through the elevator.

Somewhat more specifically, the front end of the cotton picker component 25 includes an open V-shaped cotton gatherer 30 that has two outwardly and forwardly extending sloping parts 31 on each side made up of frame elements and grid bars, as shown in FIGURE 3. By means of the backwardly converging shape of the gatherer parts 31, they may gather cotton plants and cause them to move toward the longitudinal axis of the machine as it moves forward down the cotton rows. The gathers 31 are also supported at their forward ends by elements 32, that are attached to the fronts of the gatherers 31, slope upwardly and backwardly therefrom, and are secured to the sides of the channel-shaped cotton receptacle. The parts that engage the cotton plants are covered with rounded guards so that they will not break the plants.

The housing 27 has two side frames 34 that are illustrated as having the shape of irregular pentagons. Near the middle of the cotton picking housing 27 and extending forwardly and downwardly in parallel relationship therein are two rotating brushes 36a and 36b that are spaced apart a short distance along opposite sides of the axis of the machine. The cotton plants gathered by the gatherer 30 are introduced to the space between the brushes 36a and 36b. By their rapid rotation, the brushes pick the cotton bolls from the plants along with a minimum amount of sticks and trash. The brushes 36a and 36b slope downwardly and forwardly so that they may engage with the lowest bolls on small plants at their lower front ends, and may engage with the highest bolls on higher plants at their rear ends where they are highest.

The particular brushes shown are designed to have the plants bend over where they are excessively high, so that the bolls may be picked off, but other provisions may be made for high plants, if desired.

Outside the two brushes, the cotton picking receptacle has two endless conveyors 37a and 37b. These conveyors extend from the forward lowest end of the cotton picking receptacle upwardly and rearwardly, preferably at a lower slope than that of the brushes, to the lower rear part of the housing 27.

The housing 27 is covered by a grid 39 so that cotton that is thrown off by the brushes is not thrown out of the machine, but will all descend to one or the other of the two conveyors 37a and 37b.

At the back end of the cotton picking housing 27 and supporting that housing, is the elevator generally designated 40. This elevator constitutes a conveyor that has the functions of moving the cotton from the harvesting or picking section or unit to the cleaner, preferably elevating it for reasons to appear. The elevator includes a suitable framework and housing extending more or less vertically, and supported at its upper end by means of spaced bearing plates 41 and 42 formed as forward extensions of the cleaning section 26. Since the cleaning components are firmly secured to the tractor, the foregoing bearing plates are likewise so secured and form a firm mounting for the cotton picking component 25.

The elevator 40 is actually a dual structure as shown from the rear in FIGURE 9. It has two housing portions 43 and 44, and there is a shaft 45 that passes through both of the two bearing plates 41 and 42, and the housings 43 and 44 at their tops. The shaft is given suitable journals 47 and 48 in the upper part of the two housings. Consequently, the two housings 43 and 44 of the elevator 40 are supported at their upper ends for a limited amount of swinging movement about the axis of the shaft 45.

Each of the two elevator housings 43 and 44 is secured firmly to the corresponding side of the cotton picker housing 27. FIGURE 1 shows an attaching angle connection 49 at the lower end of the elevator housing 43. A similar attachment angle 52 is used on the other side. Also, there is a downwardly and forwardly extending brace 50 between the upper part of the elevator housing 43 and the back of the cotton picker housing 27. The other elevator housing 44 is held in similar fashion by a brace 53. There is also an angular brace 54 extending across the top of the two housings 43 and 44 to hold them together at their tops. They are also attached by bracing extending between them, such as that diagrammatically shown at 55.

FIGURES 5 and 6 show that the elevator housings 43 and 44 open into the lower back part of the picking housing 27. Note that the front wall 56 of each housing 43 and 44 terminates at about the bottom part of the crossbeam 57, which beam closes the corresponding part of the housing 27 and also supports the brushes 36a and 36b. Below the front wall 56 of each housing and down to the curved bottom wall 58 is an opening 59 through which the conveyor 37a can deliver cotton to the elevator. There is a metal gate 60, swivelly mounted at 61 on the bottom of the wall 56, that aids in gathering and confining cotton onto the elevator. Each bottom wall 58 merges into a back wall 62 that extends upwardly to near the top of the housing. A shaft 63 is mounted across the bottom of both of the two housings 43 and 44. Within each housing 43 and 44, the shaft 63 has a pulley or drum 64 that supports the bottom end of an endless conveyor elevator 65 that has cleats 66 in the form of angle irons, mounted across it at spaced intervals. Each conveyor 65 extends upwardly in the housing and also passes over a suitable drum or pulley 67 mounted on the upper shaft 45.

As illustrated in FIGURES 1, 4 and 9, the bottom shaft 63 extends to the outside of the two elevator housings 43 and 44 and at its outer ends supports two sprocket wheels 68 and 69. The sprocket wheels, in turn, support sprocket chains 70 and 71, respectively, that drivingly connect with sprocket wheels 72 and 73 (FIGURE 2) on a shaft 74 that passes through the bottom of the housing 27 and supports the pulleys or drums for the upper end of the two relatively horizontal conveyors 37a and 37b. By this arrangement, the conveyors 37a and 37b are driven whenever the elevator conveyors 65 are driven. It is also evident that cotton on the two conveyors 37a and 37b is thrown across through the entrance openings 59 onto the two elevator conveyors 65 and is carried up to the top of the two elevators.

The elevator housings 43 and 44 are open at the top. There is an angular baffle 80 across the top of each elevator housing 43 or 44. FIGURES 5 and 6 show these baffles. They provide openings 82 at the top through which long sticks may pass and be discharged from the machine.

As has been stated, each conveyor or elevator housing 43 or 44 has a back wall 62. A pair of curved conveyor belt guides 85 extend inwardly from the side walls of each of the two housings 43 and 44 below the top pulley 67. These belt guides 85 force the elevator conveyors inwardly beyond a vertical line drawn through the axis of the shaft 45, so that any cotton has a free vertical fall off the conveyor, should it tend to stay with the conveyor beyond the middle of the back side of the pulleys 67. The bottom wall 58 of each elevator housing 43 or 44 confines any remaining objects that are not discharged from the conveyor so that they are carried around once again.

As has been stated, the cotton picker assembly 25, which includes the cotton plant gatherer 30, the cotton picker housing 27 and associated parts, and the elevator 40, are swivelly mounted by the shaft 45, so that they can swing to some degree about the axis of this shaft, as for example, from the down position in FIGURE 5 to an up position in FIGURE 6. This is so the gatherer 30 can be lifted above ground when the machine is not in use, or when it is necessary to pass over some obstruction.

The means for elevating the cotton picking components are shown somewhat diagrammatically, and modifications of the particular mechanism shown for this purpose could be used. Referring particularly to FIGURES 1 and 4, there are links and levers 86, 87 and 88 shown in dotted lines. The link 86 can be called the actuating link or lever, because it will connected to a further leverage or a power means for moving it forwardly and rearwardly of the machine. The link 87 supports the forward end of the link 86 and is swivelly supported to the frame near the forward end of the cleaning component, just back of the elevator. The link 88 is pivoted to the link 87 and to the link 86 at its rear end, and its front end is pivoted at 90 to the upper part of the housing 27. Therefore, forward and rearward movement of the link 86 will cause the cotton picking and elevating sections to move outwardly to the position of FIGURES 4 and 6, or backwardly to the position of FIGURES 1, 2 and 5. The amount of this movement is a matter of choice, it being understood, of course, that the greater the movement, the more difficult it is to provide the necessary driving linkage for the other elements of the machine.

As will hereafter appear, loose cotton, along with as yet unopened bolls, is cleaned off by the picking brushes 36a and 36b and thrown onto the conveyors 37a and 37b. These latter conveyors then deliver the harvested material into the bottom of the two elevator housings 43 and 44 where the twin elevators 65 carry it up and over the top of the elevator so that it can fall into the cleaning component.

The cleaning component 26 is designed to extract and clean the loose cotton and to convey it further upwardly to a position where it can be delivered to the cotton baskets or bags in conventional manner, without requiring change of the usual mounting for the cotton receptacles. The receptacles are usually supported with their upper ends about on a level with the outlet of the cotton cleaning component 26.

The cleaning component 26 includes a housing having a bottom wall made up of a sloping part 100 that extends from a rearward framing 101 forwardly and downwardly past an additional framing support 102 toward a curved section 105. The frames 101 and 102 serve to mount the apparatus on the tractor frame 21. Below the curved section 105, there is a vertical section 106 followed by an upwardly and forwardly sloping section 107. This last section 107 has an upturned forward flange 108 that can abut against the back walls 62 of the elevator 40. The shapes of these walls are, of course, subject to variation to suit the circumstances.

There are side walls for the cleaning section that may be generally indicated at 110 and 111. The top of the cleaning section housing is formed by a plurality of baffles which substantially close it. These baffles will be discussed in connection with the cleaning mechanism as the description thereof proceeds.

Adjacent the top of the elevator, and forming something of a continuation of the angular baffle 80 on the elevator, there is a downwardly and backwardly sloping baffle 115. It joins with a vertical baffle 116, which latter fits down on a somewhat curved and vertical baffle 117. Forwardly of the baffle 117 and mounted on the elevator housings 43 and 44 are downwardly and rearwardly sloping baffles 118 that project backwardly into the cleaning housing.

All of the foregoing baffles define an entrance passage 120 to receive cotton from the top of the elevator and feed it into the cleaning machinery. A feeding roll of familiar type, shown at 121, causes the cotton to be delivered downwardly in the inlet or feed passage 120, to the baffles 118, that deflect it rearwardly toward a saw cylinder 125, that acts as a cleaner-extractor, and a doffer, as will appear.

The saw cylinder 125 is in the lower part of the cleaning machine. It is a cylinder made up usually of a plurality of toothed saw discs that are stacked together like laminations along a shaft, such as the shaft 126 that is rotatably supported in appropriate bearings in the two side walls 110 and 111 of the housing. It is not necessary to show the mounting or the bearings provided therefor since they may be made in a familiar fashion.

The feeder 121, aided by gravity, feeds the trashy cotton downwardly. The baffle 118 directs it against the extractor cylinder 125 which, as viewed in FIGURE 5, is rotating counterclockwise. Loose cotton is impaled onto the teeth and carried around with them, while hulls and trash are driven away by impact and centrifugal force. This trash passes downwardly past the baffle 118 into a compartment 127 defined generally by the back walls 58 of the elevators, the saw 125, another saw cylinder 128, and a baffle wall 129. The baffle wall 129 has a brush 130 projecting from its lower end downwardly and rearwardly to the teeth of the smaller saw cylinder 128. The saw cylinder 128 has its teeth running oppositely to those of the saw 125 and it rotates clockwise.

Below the cylinder 128, there is a baffle 132 that projects downwardly and rearwardly from behind the back wall of the elevator to a cylindrical section or trough 133 that is perforated. It then extends vertically and in another arcuate section 134 followed by a further arcuate section 135 that is supported on the wall 106 and extends beyond the same in the wall 105. This portion 135—105 has a lip 136. It cradles a small saw cylinder 138 with the teeth arranged so that it can rotate counterclockwise below and rearwardly of the saw cylinder 128. The cylinder 138 is engaged by the ends of a brush 142 that is formed as a continuation of the wall 100. Within the arcuate wall 133 is a screw conveyor 137 designed to move material laterally, and finally to feed at least part of it out of the machine. The tight bolls of cotton conducted by this screw conveyor 137 can fall through the holes 139 and into a green boll gathering hopper 140.

Above the saw cylinder 125, there is a doffer brush 150 that rotates clockwise and has bristles that extend close to the cylinder 125 and drive the cotton impaled on the teeth therefrom by virtue of rotating faster than the speed of the cylinder 125. Rearwardly of the doffer 150, there is a baffle 151 that has its forward wall 152 sloping upwardly and rearwardly from adjacent the cylinder 125 to above the same. It then has a wall 153 that extends downwardly and rearwardly to a point where it may merge into a plurality of spaced bars 154 that are arcuately arranged so as to form a grid. These are beater bars through which sticks and the like may be driven. There is another saw cylinder 155 mounted within the arc of the beater bars 154 so that it can receive cotton thrown up by the doffer 150 over the baffles 152 and 153, and a top wall 156. The wall 156 prevents the cotton from the doffer from being thrown out of the machine, and aids in guiding it onto the cylinder 155 in a manner that will be evident from the drawing. In other words, the several baffles provide an admission passage which extends, generally speaking, upwardly and rearwardly and then somewhat downwardly to the cylinder 155. The cotton that is impaled upon the teeth of the cylinder 155 is carried clockwise thereby, beating sticks and the like against the beater bars 154.

The cotton on the cylinder 155 then meets another doffer 159. This doffer rotates in the direction opposite to that of the cylinder 155 and draws off the cotton impaled on the teeth of the latter, throwing it against an upwardly and rearwardly extending top wall portion 160 and associated parts of a curved baffle 162, so that it is directed to a next successive cylinder 161.

The cylinder 161 cooperates with the beater bars 164 in a manner similar to the operation of the cylinder 155. Then the cotton is doffed by another doffer 166, similar to the doffer 159, and is thrown against the top wall 167 and over the baffle 168 to a final cleaning cylinder 170, which is associated with beater bars 171 like those previously described. Finally, a doffer 173 doffs the clean cotton from the cylinder 170 and throws it against a top wall portion 174 and a baffle 175 so that it is ejected at considerable speed through an outlet passage 176, whence it may be received in the cotton bags, or similar receptacles, that are also normally suspended from the tractor.

It will be seen that the bottom wall 100 catches waste material and directs it downwardly toward the reclaiming cylinder 138 for ejection past the brush 142 and the lip 136.

A drive for the several parts of this machine can come from a power shaft 190 that may be driven from the tractor engine or other suitable prime mover on the machine. It is shown as being mounted into a gear box 191 that has a shaft 192 extending forwardly therefrom. A universal joint 193 connects the shaft 192 with a telescopic shaft 194. This shaft 194 extends to another universal joint 195 and then drives a pulley wheel 196 shown diagrammatically in FIGURE 10 and appearing also in other views, notably FIGURES 2 and 3.

A belt 197 connects over a pulley 198 that is an idler pulley and under a pulley 199 attached to the brush 36a, and thence over a pulley 200 attached to the brush 36b. By this arrangement, the belt 197 drives the two brushes in opposite directions. It will be apparent that the directions of rotation of the two brushes drives the cotton picked from the plants outwardly against the side walls of the receptacle 34, whence they can fall onto the two conveyors 37a and 37b.

In addition to the aforesaid shaft 192, the gear box 191 has a laterally extending shaft 202 which is connected through a chain and sprocket drive 203 to the shaft 126, which mounts the saw cylinder 125. As shown in FIGURE 2, a portion of the driving impetus thus received by the shaft 126 is passed on through another chain and sprocket drive 205 to the upper shaft 45 of the elevator 40. This serves to drive the elevator belts 65 and, through them, the horizontal conveyors 37a and 37b.

Referring to FIGURES 1 and 4, it will be observed that the aforesaid shaft 126 extends through to the other side of the machine and there mounts a pulley 206. A drive for the various rotating elements of the cotton cleaner is diagrammatically illustrated in the form of an endless flexible belt 207 in driven engagement with the pulley 206, as appears in these FIGURES 1 and 4. Thus, comparing the illustrations of FIGURES 1 and 4, the counterclockwise rotation imparted to the shaft 126 and cylinder 125 is extended through the pulley 206 and belt 207 to impart clockwise rotation to pulleys 208, 209, 210, 211, 212, and 213 connected, respectively, to the doffer brush 150, the feeding wheel 121, and the saw cylinders 170, 161, 155, and 128. At the same time, the belt engages pulleys 214, 215, 216, and 217 in a manner to impart desired counterclockwise rotation to the respectively connected doffers 173, 166, and 159, and reclaiming saw cylinder 138. Upper and lower idler pulleys 218 and 219 provide the usual control of direction and tension in the belt 207. It will, of course, be understood that the size of each pulley 206, 208—217 bears a predetermined relationship both to the diameter of the operative elements which it drives and to each of the other pulleys to provide the coordinated cleaning and feeding action already described.

The drive for the helical conveyor 137 is taken indirectly from the belt 207 by way of the pulley 213 and a pulley 220 mounted so as to rotate with the pulley 213. As illustrated in FIGURES 1 and 4, a belt 221 drivingly interconnects the pulley 220 with a pulley 222 associated with the conveyor.

*Operation*

The present cotton picking and cleaning machine is normally mounted at the front end of a farm tractor so as to dispose the pivotally mounted picking section 25, including the elevator 40, forwardly of the front wheels of the tractor and just above ground level. The link 86, by means of which the front end of the picking section may be raised or lowered, is then extended by suitable linkage to a lever or other control accessible to the operator of the tractor, and the power shaft 190 is connected for drive by either a conventional power takeoff of the tractor, or by an auxiliary prime mover carried thereon.

Thus mounted, the machine is readily maneuverable and can be moved continuously along the rows of a cotton field so as to embrace the successively presented plants between the gatherers 31, and guide them between the advancing brushes 36a and 36b. The helically arranged tufts of the counter-rotating brushes 36a and 36b subject each plant to an upward brushing action which, by virtue of the slope of the brushes, begins substantially at the bottom of the plant and extents to the top thereof. This removes the cotton from the plant and throws it laterally and backwardly onto the rearwardly moving conveyors 37a and 37b.

The cotton, ordinarily accompanied by the green cotton balls, as well as a goodly amount of debris such as hulls, leaves, sticks, and twigs, is delivered by the generally horizontal conveyors 37a and 37b to the lower end of twin elevator conveyors 65, which, in turn, carry the harvested material up and over the top elevator pulley 67 at which point it enters the cleaning section 26. Long sticks which, due to their length, can only move endwise up the elevator casings are projected out the top opening of the housings 43 and 44, as illustrated in FIGURE 5, and fall to the ground.

The material entering the cleaning section is fed by the feeding rolls 121 down and through the chute-like arrangement of baffles 115, 117, and 118, being deflected by the last-mentioned baffle to pass close to the upwardly moving, as well as upwardly directed, teeth of the saw cylinder 125. The cotton is picked up by the teeth of the main extracting cylinder 125, while hulls and like trash are repelled forwardly in the chamber 127. This trash, containing some cotton, falls to the cylinder 128, which extracts the cotton therefrom by impaling it onto the teeth of the cylinder 128, and forces the trash past the brush 130, to the receptacle 131, whence it is discharged from the machine by the screw conveyor 137. Green bolls fall through the holes 139 and are collected in the receptacle 140.

Cotton impaled upon the cylinder 128 is doffed therefrom by the faster moving teeth of the cylinder 125. It, along with the cotton initially impaled by the extractor cylinder 125, is doffed from the cylinder 125 by the faster moving tufts of the doffer brush 150, as previously indicated.

The extracted cotton doffed as aforesaid from the saw cylinder 125 by the doffer 150 may contain trash such as small sticks and twigs, leaves and hull parts, etc. This is especially true with certain cotton grown in some parts of the country, and particularly during particular times of the year when the plants are especially brittle, so that sticks, leaves, and the like readily break off.

Further cleaning, and particularly stick removal, is provided by the toothed cylinders 155, 161, and 170 operating in conjunction with the associated sets of beater bars 154, 164, and 171. These cleaning cylinders receive the cotton successively as explained hereinbefore and beat it against the beaters bars in a manner to eject the sticks through the bars while retaining most of the cotton. Some cotton is also beaten out, however, and descends with the trash downwardly along the sloping wall 100 to the reclaiming saw cylinder 138 and the brush 142 associated therewith.

This cylinder 138, like the cylinder 128, has rotation and tooth orientation such that the trash is driven past the brush to discharge, while the cotton is reclaimed by being impaled onto the saw teeth. The reclaimed cotton is stripped from the cylinder 138 by the faster moving teeth of the cylinder 128 and then passes on to the cylinder 125 as explained above. The cylinder 128 thus has the multiple functions of doffing the reclaiming cylinder 138, and acting as a secondary extractor cylinder. And the extractor cylinder 125 also acts as a doffer for the cylinder 128.

The cotton discharged through the elevated outlet passage 176 will ordinarily be in condition to be ginned without the necessity for further cleaning. Thus, the present machine operates to harvest the cotton in a manner that enables it to be brought in from the fields ready for ginning, leaving the unwanted trash behind, and eliminating intermediate storage, handling, and disposal of trash.

This machine provides a valuable portable combination picker and cleaner, so that the large quantities of trash are not required to be transported, and so that the cotton can be delivered directly from the picker bags to the gin, or at worst to a relatively minor final cleaning operation. Big and small sticks, hulls, rocks and at least most of the leaves, shale and the like, are removed and may be discharged back onto the ground.

Since some areas produce trashy cotton, and trashy cotton brings poorer prices at the gin, the present machine provides the planter with a way to improve his cotton from an inferior to a superior, higher-priced quality, at substantially no additional work.

It may further be observed that the machine includes both a picking component and a cleaning component, between the lowest cotton boll level near the ground and the normal or conventional height of the cotton bags. The cotton is delivered at some elevation from the picker component, at which it may be fed into the cleaner above the lowest level thereof, so as to descend to the initial extractor-cleaner portion of the cleaning component 26.

The design is such that the cotton is elevated from this extractor-cleaner portion toward the top of the machine, during which time it is further freed of sticks, trash, and the like. Finally, it is delivered from the top of the cleaner component in a stream of cleaned cotton, at a velocity and elevation that enables it to be directed into one or more receptacles, the open ends of which are made accessible to the stream.

With all parts of the machine operating in unison, the cotton starts its movement as it is removed from the plant, and stays in continuous motion until it is finally discharged as clean cotton into the receptacles.

What is claimed is:

1. A mobile cotton harvesting and cleaning machine comprising, in combination, cotton harvesting means, conveyor means, feeding means and extracting means all connected together for series processing of cotton, the cotton harvesting means being disposed just above ground level for removing and collecting cotton from growing plants and delivering it to the conveyor means, the conveyor means being constructed and positioned for conveying the cotton upwardly and rearwardly to a substantial height above ground adjacent the feeding means, the feeding means being positioned for delivering the cotton, and extraneous material collected with the cotton, to the extracting means, the extracting means being adapted to separate the cotton from the extraneous material, to discharge the extraneous material downwardly from the machine at a point below the feeding means, to separate tight bolls from the extraneous material and to discharge the cotton upwardly from the machine at a point above the feeding means.

2. A mobile cotton picking and cleaning machine comprising, in combination, cotton harvesting means disposed just above ground level for removing and collecting cotton from growing plants, conveyor means extending adjacent to the harvesting means for receiving the cotton and extraneous material, including tight cotton bolls, collected along with the cotton and for elevating said cotton and extraneous material to a substantial height above ground, a cotton extracting unit adjacent the conveyor means with an inlet disposed below the upper elevating limit of the conveyor means, the extracting unit being adapted for extracting loose cotton from the opened bolls collected therewith and at the same time eliminating the bulk of extraneous material so that the latter may be discarded downwardly along with the tight cotton bolls, and means for receiving the tight bolls and accompanying extraneous material and for separating the former from the latter, said receiving and separating means including means for collecting and retaining the separated tight bolls and means for dumping the separated extraneous material back on the ground.

3. The machine of claim 2 wherein the means for receiving and separating the discarded bolls and accompanying extraneous material comprises a screw conveyor having a trough with perforations therein for passing the bolls while retaining the extraneous material.

4. Cotton picking and cleaning machinery including: a transportable machine support, a cotton picking component on the support having means for picking cotton from plants adjacent the ground, a cleaning component on the support back of the picking component; a conveyor mechanism disposed to receive cotton from the picking means and deliver it into the cleaning component at a point above the bottom thereof; the cleaning component having means to provide a descending in-feed of cotton from the conveyor, cleaning means adjacent to the descending feed path to extract cotton from trash, cause the trash to continue to descend, and to displace the cotton in another stream, laterally of the in-feed stream; and means to remove sticks from the other stream and to continue its upward flow while being cleaned, until it is delivered at a predetermined elevation above the ground, whence it may be directed into cotton receptacles.

5. The combination of claim 4 wherein the cleaning means includes two adjacent saw cylinder type extractors, one higher than the other, and both located to receive the descending inflow of cotton; means providing a greater peripheral speed for the upper cylinder so that it can doff cotton from the lower one and add the same to cotton it has extracted from the inflow stream.

6. The combination of claim 5, wherein the stick removing means provide for separation of sticks, a descending wall to receive the sticks, a reclaimer at the lower end of the wall adjacent to the lower extractor cylinder and operating at a lower peripheral speed, whereby the reclaimer may remove cotton from the sticks, and the lower extractor cylinder may doff the cotton from the reclaimer.

7. The combination of claim 6 wherein the conveyor is substantially vertical and the extractors and reclaimer are disposed substantially vertically, so as to minimize the length of the machine and yet provide picking, extracting, and de-sticking of the cotton while elevating it from plant level to the point for delivery to the receptacles.

8. In a cotton processing machine, means for introducing into the machine cotton intermixed with trash and tight bolls, a cleaning section in the machine, means for delivering the cotton, trash and tight bolls to the cleaning section, the cleaning section having means for separating the cotton from the trash and tight bolls, extracting means for receiving the separated cotton from the separating means and for extracting other foreign matter therefrom, a trash eliminator means for eliminating trash from the machine, means for removing lint cotton therefrom and for delivering the trash and tight bolls from the separating means to the trash eliminator means, and means for separating the tight bolls from the trash before the trash is eliminated by the eliminating means.

9. The machine of claim 8 wherein the means for separating the bolls from the trash comprises aperture means adjacent the trash eliminator small enough for the passage therethrough of tight bolls but too small for the passage of most of the trash.

10. A mobile cotton harvesting and cleaning machine comprising, in combination: cotton harvesting mechanism for removing and collecting cotton from growing plants, means associated with the harvesting mechanism for delivering the harvested cotton upwardly to a substantial height above ground, the delivering means including conveyor means for lifting cotton from the picking elements, and elevating it to the extracting mechanism, an extracting mechanism to separate cotton from extraneous material and to deliver it to a point a substantial distance above ground, the extracting mechanism having its initial end disposed below the upper end of the delivering means so as to receive cotton and extraneous material from that mechanism, and the extracting mechanism extending upwardly from the initial end and including cleaning means that clean and elevate cleaned cotton and deliver it at the point elevated above ground, the conveyor means comprising enclosed elevator means provided with a discharge opening above the level of the extracting means for ejection of long sticks and stems inadvertently gathered along with the cotton.

11. In a cotton processing machine: means for introducing cotton into the machine intermixed with trash and tight bolls; preliminary separating means receiving the said cotton, separating the lint cotton with some foreign matter into a first stream and the trash and tight bolls into another direction, a saw cylinder below the separating means to receive the trash and tight bolls, to direct them away, to recover lint cotton from them, and to be doffed of the lint cotton by the preliminary cleaner; a trash eliminator means located to receive the trash and bolls directed away from the saw cylinder as aforesaid, including means to separate the bolls from the trash and to convey the trash away; extracting means for receiving the aforesaid cotton and foreign matter in the first stream from the preliminary separating means, and for removing the foreign matter from the aforesaid cotton, a reclaimer disposed to receive the foreign matter thus removed, and to reclaim lint cotton therefrom, the reclaimer including a rotatable element adjacent to the saw cylinder aforesaid, so as to be doffed thereby, whereby the saw cylinder can return the reclaimed cotton to the preliminary cleaner and thence to the extracting means.

References Cited in the file of this patent

UNITED STATES PATENTS

| | | |
|---|---|---|
| 888,396 | Gardner | May 19, 1908 |
| 1,007,504 | Tanner | Oct. 31, 1911 |
| 1,398,930 | Bennett | Nov. 29, 1921 |
| 1,538,023 | Burton | May 19, 1925 |
| 1,638,867 | Melton | Aug. 16, 1927 |
| 2,033,081 | Mackenzie | Mar. 3, 1936 |
| 2,049,640 | Conrad | Aug. 4, 1936 |
| 2,672,719 | Wagnon | Mar. 23, 1954 |
| 2,707,364 | Wagnon | May 3, 1955 |
| 2,739,353 | Mitchell et al. | Mar. 27, 1956 |
| 2,776,454 | Dyson | Jan. 8, 1957 |
| 2,862,247 | Vandergriff et al. | Dec. 2, 1958 |
| 2,903,749 | Mitchell | Sept. 15, 1959 |